Sept. 21, 1965   E. LAVIN ETAL   3,207,626
PROCESS FOR COATING A WIRE WITH SUPERIMPOSED LAYERS
OF POLYESTER ENAMEL AND POLYVINYL ACETAL
ENAMEL AND ARTICLE
Filed Feb. 6, 1961
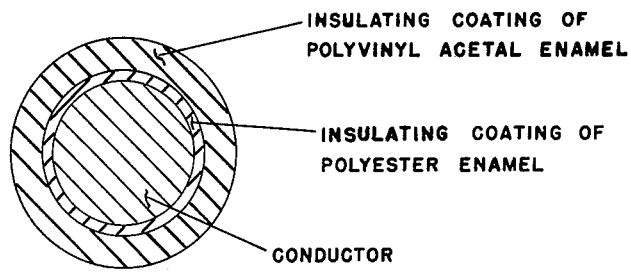
FIG.I
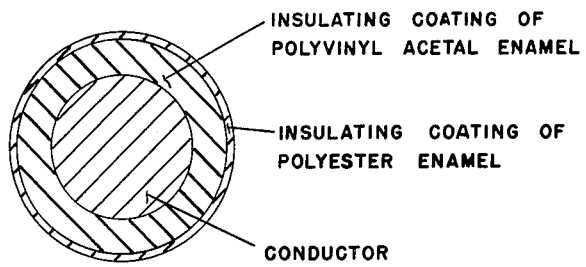
FIG.2
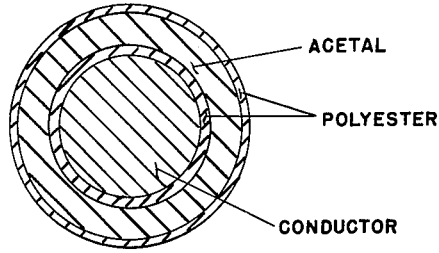
FIG.3
EDWARD LAVIN
ALBERT H. MARKHART    INVENTORS
ROBERT E. KASS
BY *Karl H. Haag*
ATTORNEY

United States Patent Office 3,207,626
Patented Sept. 21, 1965

3,207,626
PROCESS FOR COATING A WIRE WITH SUPERIMPOSED LAYERS OF POLYESTER ENAMEL AND POLYVINYL ACETAL ENAMEL AND ARTICLE
Edward Lavin, Longmeadow, and Robert E. Kass and Albert H. Markhart, Wilbraham, Mass., assignors to Shawinigan Resins Corporation, Springfield, Mass., a corporation of Massachusetts
Filed Feb. 6, 1961, Ser. No. 87,088
14 Claims. (Cl. 117—218)

This invention relates to enameled wires; more particularly, this invention relates to wires coated with multiple layers of cured polyvinyl acetal resin compositions and of polyester resin compositions.

Magnet wires coated with compositions based on polyvinyl formal are well known. They are generally used at operating temperatures not exceeding 105° C. and, for this reason, are considered to be "class A" wires, in accord with the prevailing electrical insulation code. The delicate balance of excellent mechanical, chemical and electrical properties possessed by these wires and their relatively low cost are certainly important factors contributing to the wide use of these polyvinyl formal wires in the electrical industry.

It is well established, on the other hand, that the output of motors and generators is increased considerably when the density of the current in the magnet wire of these machines is raised. Unfortunately, greater current density creates higher operating temperatures, and that shortens the life of "class A" wire. Yet, if one keeps in mind the well balanced physical properties of polyvinyl acetal coated wire, its low cost, its general acceptance, the large investment of the wire coating industry in equipment designed to produce it, and the shortcomings of the other classes of wire that have been proposed as substitutes, the desirability of upgrading "class A" polyvinyl acetal magnet wire to higher classifications while maintaining its other present thermal properties such as heat shock resistance, becomes evident.

Another type of wire enamel, known as the terephthalic acid ester type, has found some application in "class B" or "class F" magnet wires, designed to operate at temperatures up to 130° C. and up to 155° C. respectively. Again it is unfortunate that these wires suffer from several defects such as poor heat shock, short dielectric lives at extreme temperatures, at 300° C. for instance, and poor hydrolytic stability.

It is also known that impregnation with varnishes based upon polyesters can upgrade the thermal life of polyvinyl acetal coatings. However, because of differences in chemical composition, solubility, and viscosity between varnishes and enamels, the varnishes do not achieve the improvement sought by this invention and, moreover, suffer from the inconvenience that they must be applied after motors and generators are wound.

It is therefore an object of this invention to upgrade the thermal life of polyvinyl acetal magnet wire so that it will perform efficiently at operating temperatures up to 130° C. ("class B") and up to 155° C. ("class F"). Another object is to produce organic "class B" and "class F" wire coatings which can resist abrasion, are not bulky and can be machine-wound.

A further object of this invention is to create "class B" and "class F" magnet wire insulations with satisfactory heat shock behavior.

These and other objects are attained by applying a thin layer of a terephthalic polyester enamel over a base coat of polyvinyl acetal or modified polyvinyl acetal enamel. This is illustrated in FIGURE 2 by showing a cross section of a wire coated with the two types of enamels superposed. Large improvements in thermal stability are obtained without some of the disadvantages existing when the polyesters are employed alone. The resulting enameled wier possesses a 300° C. thermal stability in excess of either polyester or polyvinyl acetal enameled wires and yet maintains the good heat shock characteristics of a polyvinyl acetal enameled wire. Thus when polyester and polyvinyl acetal enamels are superposed on a wire, a synergistic effect is created. This is all the more interesting and surprising since in contrast to superposition, mixing the two enamels and coating the mixture on wire will not produce the desired magnitude of improvement.

The following examples will serve to illustrate but not to limit the invention.

For instance, although it has been found practical and convenient to effect all the coating reported here with well known standard preparations or mixtures of components available commercially, it must not be concluded that the invention is thus circumscribed.

EXAMPLES 1 TO 6

Four enamels containing a polyvinyl acetal resin have been employed along with three polyester type enamels. The compositions of these enamels are shown in Table I, in parts by weight on a solids basis.

Table I

| Components | ENAMELS | | | | | | |
|---|---|---|---|---|---|---|---|
| | A | B | C | D | E | F | G |
| Polyvinyl formal | 100 | 100 | 100 | 100 | | | |
| Phenolic resin | 50 | 40 | 10 | 40 | | | |
| Polyurethane H | | 10 | 60 | 45 | | | |
| Melamine-formaldehyde hyde resin | | | 7.5 | 7.5 | | | |
| Terephthalic polyester resin J | | | | | 100 | | |
| Terephthalic polyester resin K | | | | | | 100 | |
| Terephthalic polyester L | | | | | | | 100 |
| Polyurethane M | | | | | 29.3 | | |
| Cresylic acid | 250 | 250 | 250 | 227 | 242 | 240 | 240 |
| Hydrocarbon solvent | 500 | 500 | 500 | 518 | 60 | 60 | 60 |

Both the components and the enamels just mentioned are well known to the trade.

The polyvinyl formal employed contains 10.5% acetate groups calculated as polyvinyl acetate, 6% hydroxyl groups calculated as polyvinyl alcohol, and 83.5% formal groups calculated by difference as polyvinyl formal. The phenolic resin is a soluble, fusible heat-hardenable reaction product of 100 parts cresol, 60 parts formalin, and 3.2 parts ethanolamine, dissolved in commercial cresylic acid. Polyurethane H stands for the phenol blocked reaction product of one mol trimethylol propane with three mols of a mixture containing about 80% 2,4- and about 20% 2,6-tolylene diisocyanates. The melamine-formaldehyde resin is a relatively low molecular weight, butylated, internally plasticized condensation product of 1 mol melamine with 3.5 mols formaldehyde and 0.5 mol paratoluene sulfonamide.

Terephthalic polyester J is the reaction product of terephthalic acid with ethylene glycol and glycerol; polyester K is a very similar resin except that pentaerythritol is substituted for some of the glycerol in its preparation. The third polyester used, polyester L, is a linear polyethylene terephthalate prepared from terephthalic acid and glycol only. Polyurethane M is identified as the phenolic adduct of the trimer of tolylene diisocyanate. Finally, the last two components employed in the preparation of the enamels used in the following examples are commercial cresylic acid and naphtha.

Little need be said about the enamels (A to G) described in Table I; they will be easily recognized by workers in the field.

These enamels were applied to number 18 (0.0403 inch) copper wire by conventional wire coating means, each coating being cured by passing the dipped wire through a vertical oven 12 feet high with a set cure temperature of 350° C. at a rate of speed varying from 12 to 18 feet of wire per minute. A split applicator was employed so that the desired number of base coats and top coats could be applied in one continuous operation. The control enamels, A to F inclusive, were applied in six successive coats to give a heavy build, that is an insulated wire with a diameter about 3.0 mils larger than that of the original bare wire. The linear polyethylene terephthalate enamel (G) was not used in this control series simply because it is not designed to be an enamel in its own right; it appears that its chemical inability to crosslink adversely affects certain properties which are essential to good magnet wire, resistance to abrasion and to solvents for example. The new insulations of later examples were obtained by using four coats of a polyvinyl formal resin (A, B, C, or D) and two coats of a polyester enamel (E, F or G) either over or under the polyvinyl acetal coats.

Testing of the enameled wire was done by standard procedure. Because, as mentioned earlier, hardly any significant differences were noticed between the mechanical, chemical and electrical properties of the new wires and those of the polyvinyl acetal wires, the procedures employed for testing these properties will not be described. On the other hand, since an improvement of some of the thermal properties of magnet wire goes to the essence of this invention, the testing procedures therefor will be presently outlined.

*1 kilovolt-life test.*—The 1 kv.-life test was made in accordance with the provisions of the American Institute of Electrical Engineers specifications No. 57, dated October 1955. The test is a measure of the period for which a coating can be exposed at the particular temperature indicated before it will fail as electrical insulation upon the application of 1000 volts for one second to the sample. Ten samples are used in each test.

*The heat shock test.*—This test measures the resistance to cracking of stressed magnet wire coatings when heated. The coated wire is wound ten turns about itself ($1x$), ten turns about a mandrel twice its diameter ($2x$), and ten turns about one thrice its diameter ($3x$). The sample is then heated for one hour in an oven at 160° C. The diameter of the smallest mandrel over which no crack has developed in the insulation is reported.

Table II shows the significant properties of the control wires covered with standard enamels at optimum cure. These values will serve as a basis for evaluation of the new insulations reported later.

*Table II*

| Example | Enamel | Heat shock, 160° C. | 1 kv.-life, hours | | | |
|---|---|---|---|---|---|---|
| | | | 180° C. | 200° C. | 225° C. | 300° C. |
| 1 | A | 1x | 214 | 89 | 21 | 4 |
| 2 | B | 1x | 157 | 142 | 22 | 3.5 |
| 3 | C | 1x | 372 | 134 | 40 | 3 |
| 4 | D | 1x | 364 | 187 | 37 | 3.5 |
| 5 | E | 2x | over 1,300 | over 650 | over 650 | 4 |
| 6 | F | 3x | over 1,300 | over 650 | over 650 | 7 |

It is evident that some of the figures just reported are not final. This only means that, taking the "greater than 1300 hours" value for the life of enamel E at 180° C. as an illustration, some of the ten samples used for this determination were still resisting the treatment in question at the time reported. It will later become clear that the unfinished test values do not detract from the understanding of the present invention. The results, as they are, certainly demonstrate the poor heat shock characteristics of the polyester enamels used and the greater deterioration of the polyvinyl acetal insulations at the higher temperatures. On the other hand, a remarkable contrast can be seen by comparing the drastic reduction in polyester enamel lives between the temperatures of 225° C. and 300° C. with the more gradual shortening of the polyvinyl acetal enamel lives at the same temperatures. As a result of this phenomenon, and this should be noted for later reference, the 1-kv. lives of both classes of enamels at 300° C. are equally short.

EXAMPLES 7–10

In contrast to the control coatings, the enameled wires produced by the application of two coats of polyurethane modified polyester enamel (E) over four coats of polyvinyl acetal enamels emerged with rather surprising thermal properties, as shown in Table III. This arrangement of insulation layers is illustrated in FIGURE 2. Note that in this and in the other figures all the contiguous layers of one resin composition have been fused into one layer in order to simplify the drawing.

*Table III*

| Example | Enamels | Heat shock, 160° C. | 1 kv.-life, hours | | |
|---|---|---|---|---|---|
| | | | 200° C. | 225° C. | 300° C. |
| 7 | E over A | 1x | 308 | 298 | 17.5 |
| 8 | E over B | 1x | 560 | 236 | 14.3 |
| 9 | E over C | 1x | over 1,300 | over 1,300 | 19.5 |
| 10 | E over D | 1x | over 1,300 | over 1,300 | 20.5 |

Of particular interest is the synergistic effect of the combination of both types of layers as evidenced by a comparision of the 1 kv.-life values at 300° C. for these new coatings with that of the controls in Table II; to be noted also is the uniformly good heat shock behavior.

EXAMPLES 11–13

The synergism created by the superposition of the two types of enamels is all the more unexpected when the properties of wires enameled with mixtures of polyvinyl acetal and of polyester are considered. In the present examples, as shown in Table IV, the indicated amount of the appropriate resins were mixed and six coats of the mixtures were applied to wire in the conventional fashion.

*Table IV*

| Example | Mixture, percent by weight | 1 kv.-life, hours | | |
|---|---|---|---|---|
| | | 200° C. | 225° C. | 300° C. |
| 11 | 34% of E and 66% of A | 300 | 77 | 6 |
| 12 | 34% of F and 66% of D | 216 | 185 | 10 |
| 13 | 34% of E and 66% of D | 495 | 192 | 6 |

The absence of significant improvement in 1 kv.-life at 300° over the controls of Table II as opposed to that realized in the overcoatings of Table III is remarkable.

EXAMPLES 14–17

Wires were insulated with 2 coats of polyesters F over 4 base coats of a polyvinyl acetal resin, as shown in FIGURE 2. The results of the thermal tests were as follows:

*Table V*

| Example | Enamels | Heat shock, 160° C. | 1 kv.-life, hours | | |
|---|---|---|---|---|---|
| | | | 200° C. | 225° C. | 300° C. |
| 14 | F over A | 1x | 362 | 146 | 11.5 |
| 15 | F over B | 1x | over 400 | 189 | 13 |
| 16 | F over C | 1x | over 450 | 287 | 15 |
| 17 | F over D | 1x | over 500 | 269 | 13.5 |

Here again, 300° C. 1 kv. lives noticeably longer than those of one-enamel coatings have been achieved and again the heat shock characteristics are excellent. Also, heat lives at temperatures below 300° C. are considerably above those of polyvinyl formal wires.

EXAMPLES 18–21

The synergism with which we are concerned was also found to operate where coatings of linear polyethylene terephthalate enamels were superposed on polyvinyl acetal coatings. In the next four examples two coats of polyester were placed on four base coats of polyvinyl formal, as usual (FIGURE 2). The relevant heat shock and 1-kv. life results are given in Table VI and need no explanation at this stage.

*Table VI*

| Example | Enamels | Heat shock, 160° C. | 1 kv.-life, hours | | |
|---|---|---|---|---|---|
| | | | 200° C. | 225° C. | 300° C. |
| 18 | G over A | 1x | over 164 | over 66 | 13 |
| 19 | G over B | 1x | over 175 | over 85 | 15.4 |
| 20 | G over C | 1x | over 169 | 61 | 11 |
| 21 | G over D | 1x | over 172 | 66 | 25 |

EXAMPLES 22–27

The order of application of the enamels was then reversed. Two coats of the polyester resin were applied to the bare wire by the usual method and four coats of the polyvinyl formal resin followed as illustrated by FIGURE 1. Table VII shows the results of the pertinent tests on wires so treated.

*Table VII*

| Example | Enamels | Heat shock, 160° C. | 1 kv.-life, hours | | |
|---|---|---|---|---|---|
| | | | 200° C. | 225° C. | 300° C. |
| 22 | E under A | 1x | over 1,357 | 348 | 242 |
| 23 | E under C | 1x | over 1,173 | 363 | 159 |
| 24 | E under D | 1x | over 856 | 299 | 164 |
| 25 | F under A | 1x | over 1,674 | 350 | 182 |
| 26 | F under C | 1x | over 1,540 | 368 | 147 |
| 27 | F under D | 1x | over 1,557 | 468 | 205 |

The general thermal life improvement and the consistently excellent heat shock characteristics are evident once more. However, no beneficial synergistic effect on 300° C. 1 kv.-life was detected in these wires.

It is evident, of course, that many widely different embodiments of this invention other than those provided in the examples may be made by persons skilled in the art without departing from the scope and the spirit thereof.

For instance, the polyvinyl acetals that must be used in this invention are obtained by the acetalization of polyvinyl esters, partially hydrolyzed polyvinyl esters, and fully hydrolyzed polyvinyl esters, according to methods well known in the art, such as those found in U.S. Reissue No. 20,430 to Morrison et al. Polyvinyl acetals normally contain a certain number of hydroxyl groups and may contain a certain number of ester groups depending upon the extent of the hydrolysis and the acetalization reactions; the preferred resins will be those containing, on a weight basis from about 1 to about 35% ester groups calculated as polyvinyl ester, from about 3 to about 15% hydroxy groups calculated as polyvinyl alcohol, the balance being substantially aldehyde acetal. In the commercial polyvinyl formals which were used in the examples, the ester groups were acetate groups. While formaldehyde is preferred as an acetalizing agent because of its greater reactivity, the process may be carried out with acetaldehyde, propionaldehyde, butyraldehyde and mixtures thereof. Higher aliphatic aldehydes, as well as aromatic aldehydes, may also be employed.

The phenol aldehyde resins used in these compositions are soluble, heat-hardenable condensates of a phenol and an aldehyde, as revealed in U.S.P. 2,307,588. They are generally prepared by reacting 1 mol of a phenol with from 0.7 to 2 mols of a lower aldehyde under alkaline conditions. Acetaldehyde, propionaldehyde and butyraldehyde may be used as well as others, but formaldehyde is usually preferred because of its greater reactivity. A variety of phenols may be used including monohydric phenols such as phenol, cresols, xylenols, ethylphenol, p,t-butyl phenol, other alkyl phenols, etc., or mixtures thereof.

Usable polyurethanes are polyisocyanates blocked with organic compounds containing at least one reactive hydrogen atom. These blocking agents must split off at enamel cure temperatures in order to provide free isocyanate groups to crosslink the resinous compositions of the enamel.

Suitable reactive hydrogen compounds include phenols, such as phenol, cresol, xylenols, etc., secondary aromatic amines, mono- and polyfunctional alcohols, amines, lactams, enols, and mixtures thereof. The preferred blocking agents are compounds in which an hydroxyl group is attached to an aromatic ring.

The simplest class of useful polyisocyanates can be represented by the following formula:

$$R(-N=C=O)_n$$

where R represents a member of the class consisting of aliphatic hydrocarbons containing up to 8 carbon atoms, aromatic hydrocarbons containing up to 13 carbon atoms, alicyclic hydrocarbons containing up to 6 carbon atoms, and alkyl-aryl substitutes thereof, and $n$ is an integer from 2 to 4. Suitable polyisocyanates include compounds such as phenylene diisocyanates, diphenylene diisocyanates, tolylene diisocyanate, naphthylene diisocyanates, diphenylmethane diisocyanates, cyclohexane diisocyanates, ethylene diisocyanates, tetramethylene diisocyanate, hexamethylene diisocyanate, polyaryl polyisocyanates, trimers of polyisocyanates, polyisocyanates which are the reaction products of diisocyanates or triisocyanates with polyhydric alcohols and the like, and mixtures, trimers and isomers thereof.

The preferred polyurethanes are produced from monomers or trimers of aromatic diisocyanates which are fully blocked in order to advantageously avoid premature curing and yet obtain the rapid, uniform and complete curing required for good solvent resistance, heat stability and the numerous other properties needed for satisfactory electrical insulation.

One of the preferred classes of useful polyurethanes consists of blocked trimers of aromatic isocyanates and is illustrated by the general formula

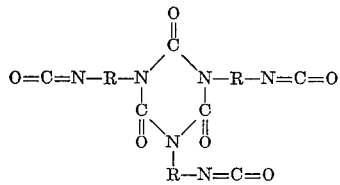

where R is an aromatic hydrocarbon radical containing up to 13 carbon atoms, or an alkyl substitute thereof. The isocyanate groups are blocked with a reactive hydrogen containing compound. Polyurethane H of the examples is typical of this class.

The other preferred class of polyurethanes is made of the blocked reaction products of a polyhydric alcohol with an arylene diisocyanate. The polyhydric alcohols are in general limited to compounds containing not more than 16 carbon atoms and when used in wire enamels should preferably contain not more than 10 carbon atoms. Examples of these polyhydric alcohols are ethylene glycol, propylene glycol, glycerol, trimethylol propane, pentaerythritol, hexane-triols, etc. This class of preferred polyurethanes is illustrated by the general formula

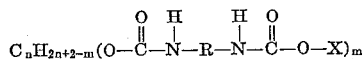

where R represents a member of the class consisting of the phenylene, methyl phenylene, naphthylene and methyl naphthylene groups, X represents a member of the class consisting of the phenyl and alkylphenyl groups, said alkyl groups containing 1–6 carbon atoms; $m$ is an integer greater than 1 but not greater than $n$ and $n$ is an integer from 2 to 10. Polyurethane M of the examples belongs to this class.

The melamine resins which can be used in the present wire enamel compositions can be selected from the general class of resinous aldehyde condensation products of melamine which are soluble in the organic liquids employed as solvents for the resinous components of the enamel. The useful melamine compounds include such derivatives of melamine as melam and melem. The aldehyde condensation products are well known and may be formed by reacting from 1–6 mols of the aldehyde with 1 mol of melamine. The solubility of the aldehyde-melamine condensation product is generally obtained by further reacting the condensation product with an alcohol or by co-condensing the melamine and aldehyde in the presence of an alcohol.

The usable aldehydes are aliphatic, aromatic cyclic and heterocyclic aldehydes including formaldehyde, acetaldehyde, propionaldehyde, butyraldehyde, isobutyraldehyde, valeraldehyde, octaldehyde, benzaldehyde, cinnamaldehyde, cyclohexanone, furfural, etc.

The alcohols which may be used include aliphatic, cycloaliphatic, aromatic, nitro, and amino alcohols such as methanol, ethanol, propanol, isopropanol, butanol, isobutanol, pentanols, octanols, lauryl alcohol, cetyl alcohol, stearyl alcohol, cyclohexanol, benzyl alcohol, cinnamyl alcohol, allyl alcohol, 2-nitro-1-butanol, 2-nitro-2-methyl-1-propanol, 2-nitro-2-methyl-1,3-propane diol, 2-nitro-2-ethyl-1,3-propane diol, tris(hydroxymethyl)nitromethane, 2-amino-1-butanol, 2-amino-2-methyl-1-propanol, 2-amino-2-methyl-1,3-propane diol, 2-amino-2-ethyl-1,3-propane diol, tris(hydroxymethyl)amino methane, etc. Mixtures of two or more alcohols may be used if desired. The amounts of alcohol reacted are generally equal to or in excess of the formaldehyde on a molar ratio.

The preferred melamine resins are the further reaction products of the melamine aldehyde and alcohol reactants with an aryl sulfonamide. These products are also well known and may be obtained by co-condensation of all the reactants named, as taught in U.S. 2,508,875, which is hereby incorporated by reference. The useful aryl sulfonamides include benzene sulfonamide and the ring-substituted derivatives thereof such as toluene sulfonamides, chlorobenzene sulfonamides, nitrobenzene sulfonamides, etc.

For reasons of economy and availability, it is preferred to use the co-condensation products of melamine, toluene sulfonamide, formaldehyde and butanol. The proportions of reactants may be varied between the limits of 1 mol of melamine to from 0.1 to 1.0 mol of toluene sulfonamide and from 1 to 6 or more mols of formaldehyde. An excess of formaldehyde may be used. The toluene sulfonamide may be any of the isomeric ortho, meta or para derivatives or it may be a mixture of two or more of the isomers.

Any of the polyester resins disclosed in Sheffer et al., U.S.P. 2,889,304, and in Precopio et al., U.S.P. 2,936,296, may be used in this invention. The preferred resins are, for convenience, those commercially available. The polyesters of Sheffer et al., are essentially the reaction products of terephthalic or isophthalic acid with a mixture of 30 to 70% by weight of a polyhydric alcohol having at least three hydroxyl groups and 70 to 30% by weight of an α,ω-diol, 20 to 100% of this diol being a 4–5 carbon atom molecule and the rest, if any, ethylene glycol. The compositions taught by Precopio et al., on the other hand, are made by heating together from 25–56 equivalent percent of a lower alkyl ester of terephthalic or isophthalic acid, from 15 to 46 equivalent percent of ethylene glycol and from 13 to 44 equivalent percent of a polyhydric alcohol having at least three hydroxyl groups per molecule. The limiting factor of this type of polyester for use in this invention is the availability of free hydroxyl groups for reaction with polyisocyanates when this is desired.

Another type of polyester resin which may be used successfully is illustrated by the recurring structural unit of the general formula

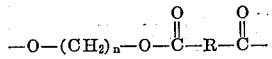

where R s an aromatic or an alkyl-substituted aromatic radical containing from 6 to 16 carbon atoms with not more than 6 of them in the alkyl groups, and $n$ is an integer greater than 1 but not exceeding 8. These linear polyesters are usually prepared according to Whinfield et al., U.S.P. 2,465,319, and Edwards et al., U.S.P. 2,503,251, by the transesterification of a lower aryl or alkyl ester of the dicarboxylic acids of a glycol. Other activated forms of the acids, such as the chlorides, may also be used advantageously.

Some of the resinous coatings of this invention are the solid reaction products, cured at 250 to 450° C., of 100 parts by weight of a polyvinyl acetal, 5 to 100 parts of a phenol aldehyde resin, and when desired, 20 to 200 parts of a polyurethane with or without 0.5 to 20 parts of a melamine resin. Other coatings may contain, for each 100 parts of a polyester resin, 0 to 40 parts of a polyurethane. The preferred balance of the properties required for insulated wire is obtained by the application of polyvinyl acetal resins containing, for each 100 parts of polyvinyl acetal, 10 to 80 parts of a phenol aldehyde resin, 10 to 80 parts of a polyurethane and 0.5 to 20 parts of a melamine resin, and of polyester resins containing for each 100 parts of polyester, 10 to 50 parts of a polyurethane. The actual compositions formulated for each wire can vary within these ranges and are dependent upon the number and type of component resins used and upon the ultimate properties desired.

While it would seem reasonable to conclude, after an examination of the results shown in the examples, that the improved properties of wire coated with a combination of enamels are achieved only when all the polyester layers are contiguous, this does not appear to be the case since a wire coated with a sandwich arrangement of insulative coats, namely four coats of polyvinyl formal resin between two coats of polyester resin (FIGURE 3), was found to possess the unusually long 300° C. 1–kv. life attributed to the synergism created by the combination of enamels. As to the improvements in heat shock behavior, it is clearly not dependent upon the order of deposition of the different resins.

Another factor which appears to be definitely involved in the synergistic effect of the enamel combinations of this invention is the presence of organic polyisocyanates. The most successful resin combinations were found to be those where each of the two enamels contained such compounds. It is known, of course, that the function of the isocyanate is to cross-link the resin which contains it, but this explanation of the mechanism by which a particular resin is improved does not account per se for the synergism observed in combinations of layers of different resins, inasmuch as some synergistic effect has been shown where no isocyanate is present.

The preferred number of coats of resins are four and two for the acetal resins and the polyester respectively. This invention is not bound by those optimum figures, however. Under certain circumstances, wires with satisfactory properties will be achieved with an insulation cover of any thickness between 0.1 to 4 mils, this up to a point being a function of the wire diameter and the viscosity of the liquid enamel, applied in 2 to 14 layers. As to the particular number of coats of a particular enamel, no restriction to the four and two arrangements is intended. Combinations of five coats of polyvinyl acetal resin and one coat of polyester, for instance have shown the synergistic effect of interest and, moreover, as in the case of one coat of polyurethane modified polyester over five coats of polyvinyl formal modified with a phenol-aldehyde resin, a melamide-aldehyde resin and a polyurethane, desirable properties other than the thermal ones were unusually improved in an inexplicable manner; in this particular instance, a surprisingly high abrasion resistance was achieved.

These combinations of enamel layers may be used on any size of wire, on a variety of metals, and on other materials. Other non-electrical uses of this coating process are indicated where chemical resistance, temperature stability, smoothness, toughness, adherence to metal, resistance to abrasion and resistance to solvents are required of the finished coating.

Various other materials such as fillers, plasticizers, coloring agents, etc., may be incorporated as is conventional in the art.

Other applications will readily suggest themselves to the many skilled in the art.

What we claim is:

1. A metal conductor coated with superposed layers of at least one layer of a cured polyvinyl acetal composition and with at least one layer of a polyester composition selected from the groups consisting of (A) compositions comprising the polymeric reaction product of an acid selected from the group consisting of terephthalic acid, isophthalic acid, and mixtures thereof, with an $\alpha,\omega$-dihydric alcohol and a polyhydric alcohol containing at least three hydroxyl groups and (B) compositions comprising the polymeric reaction product of an aromatic dicarboxylic acid containing from 8 to 18 carbon atoms with a glycol containing from 2 to 8 carbon atoms; each layer having been individually cured.

2. A metal conductor coated with superposed layers of at least one layer of a cured polyvinyl acetal resin composition and with at least one layer of a cured polyester resin composition comprising the reaction product of an acid selected from the group of isophthalic acid, terephthalic acid, and mixtures thereof, with an $\alpha,\omega$-dihydric alcohol and another polyhydric alcohol containing at least three hydroxyl groups; each layer having been individually cured.

3. A metal conductor coated with insulation of a thickness of 0.1 to 4.0 mils consisting of 2 to 14 layers of resins of claim 1.

4. An insulated conductor comprising a metallic element coated with multiple, superposed layers of two separately applied compositions consisting of
(A) a resinous composition comprising, in parts by weight,
(1) 100 parts of the polyvinyl acetal of a saturated aliphatic aldehyde, and
(2) 10 to 80 parts of a soluble, heat-hardenable alkyl-phenol-formaldehyde resin,
(B) and another resinous composition comprising an hydroxyl group bearing a polyester resin composed of the reaction product of an acid selected from the group consisting of isophthalic acid, terephthalic acid, and mixtures thereof, with an $\alpha,\omega$-dihydric alcohol and a polyhydric alcohol containing at least three hydroxyl groups; each layer having been individually cured.

5. The conductor of claim 4 where the polyvinyl acetal containing resin is modified by the inclusion of 10 to 80 parts of a blocked organic polyisocyanate.

6. The conductor of claim 5 where the blocked polyisocyanate is the phenolic adduct of the reaction product of about one mol trimethylol propane with about three mols tolylene diisocyanate.

7. The conductor of claim 5 wherein the polyvinyl acetal containing resin is further modified by the inclusion of 0.5 to 20 parts of a melamine formaldehyde resin.

8. The conductor of claim 4 where the polyester resin is modified by the inclusion of 10 to 50 parts of a blocked organic polyisocyanate adduct for each 100 parts of polyester.

9. The conductor of claim 8 where the blocked polyisocyanate is the phenolic adduct of the trimer of tolylene diisocyanate.

10. An insulated conductor comprising a metallic element coated with multiple, superposed layers of two separately applied compositions consisting of
(A) a resinous composition comprising essentially in parts by weight,
(1) 100 parts of the polyvinyl acetal of a saturated aliphatic aldehyde,
(2) 10 to 80 parts of a soluble, heat-hardenable alkylphenol-formaldehyde resin,
(3) 10 to 80 parts of a block organic polyisocyanate adduct of the general formula

$$C_nH_{2n+2-m}(\text{---O---CO---NH---R---NH---CO---OX})_m$$

where R is a member of the class consisting of phenylene, methyl phenylene, dimethyl phenylene, naphthylene and methyl naphthylene groups, where X represents a member of the class consisting of phenyl and alkyl phenyl groups, said alkyl groups containing 1 to 6 carbon atoms, where $m$ is an integer greater than 1 but not greater than $n$, and where $n$ is an integer from 2 to 10,
(4) 0.5 to 20 parts of the co-condensation products of one mol of melamine with from 0.1 to 1.0 mol of a toluene sulfonamide and from 1 to 6 or more mols of formaldehyde, in the presence of butanol,
(B) and another resinous composition comprising essentially the polymeric reaction product of an aromatic dicarboxylic acid containing from 8 to 18 carbon atoms with a glycol containing from 2 to 8 carbon atoms; each layer having been individually cured.

11. A process for producing a wire coated with a 0.1 to 4 mil thick covering consisting of about 2 to 14 superposed layers of insoluble and infusible resins, separately dried and cured at 250 to 450° C., applied by passing the wire through two separate liquid compositions comprising essentially, in parts by weight,
(A) in one of the compositions,
(1) 100 parts of a polyvinyl acetal resin obtained by the partial acetalization of polyvinyl alcohol with a member of the group consisting of formaldehyde, acetaldehyde, propionaldehyde, butyraldehyde, and mixtures thereof,
(2) 10 to 80 parts of a soluble, heat-hardenable phenol aldehyde resin obtained by condensing one mol of phenol, cresol, xylenol, and mixtures thereof, with from 0.75 to 2.0 mols of formaldehyde, under alkaline conditions,
(3) 10 to 80 parts of a blocked organic polyisocyanate adduct of the general formula

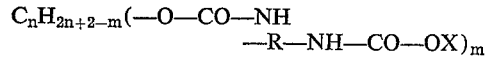

$$C_nH_{2n+2-m}(\text{---O---CO---NH}\\ \text{---R---NH---CO---OX})_m$$

where R is a member of the class consisting of phenylene, methyl phenylene, dimethyl phenylene, naphthylene and methyl naphthylene groups, where X represents a member of the class consisting of phenyl and alkyl phenyl groups, said alkyl groups containing 1 to 6 carbon atoms, where $m$ is an integer greater than 1 but not greater than n, and where n is an integer from 2 to 10,
(4) 0.5 to 20 parts of the co-condensation products of one mol of melamine with from 0.1 to 1.0 mol of a toluene sulfonamide and from 1 to 6 or more mols of formaldehyde, in the presence of butanol, (B) and in the other composition,
(1) 100 parts of a free hydroxyl group bearing resin consisting of the condensation product of terephthalic acid, glycol and glycerol, and
(2) 10 to 50 parts of the blocked adduct of an organic polyisocyanate of the general formula

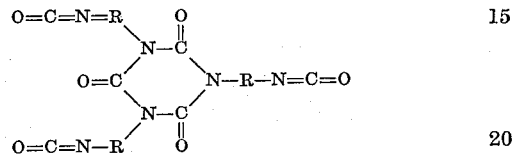

where R is a member of the class consisting of hydrocarbon radicals containing up to 13 carbon atoms, and alkyl-aryl substitutes thereof, and where the blocking compound is a phenol.

12. A metal conductor coated according to the process of claim 11 with four coats of the polyvinyl acetal containing composition and two coats of the polyester containing composition.

13. A process for producing a wire coated with a 0.1 to 4 mil thick covering consisting of about 2 to 14 superposed layers of insoluble and infusible resins, separately dried and cured at 250–450° C., applied by passing the wires through two separate liquid compositions consisting essentially of, in parts by weight, (A) for one of the compositions
(1) 100 parts of polyvinyl formal containing about 10.5% acetate groups calculated as polyvinyl acetate, about 6% hydroxyl groups calculated as polyvinyl alcohol, and about 83.5% formal groups calculated by difference as polyvinyl formal;
(2) 5 to 45 parts of a soluble, fusible, heat-hardenable reaction product of about 100 parts cresol, about 60 parts formalin and about 3.2 parts ethanolamine;
(3) 40 to 65 parts of the phenolic adduct of the reaction product of about one mol trimethylol propane with about three mols tolylene diisocyanate;
(4) 2.5 to 12.5 parts of the butylated internally plasticized condensation product of about one mol melamine with about 3.5 mols formaldehyde and about 0.5 mol para-toluene sulfonamide;
(5) 200 to 750 parts of cresylic acid;
(6) 0 to 600 parts of naphtha;

(B) and for the other composition,
(1) 100 parts of a free hydroxyl bearing resin consisting of the condensation product of terephthalic acid, glycol and glycerol;
(2) 10 to 50 parts of the phenolic adduct of the trimer of tolylene diisocyanate;
(3) 200 to 500 parts of cresylic acid;
(4) 0 to 100 parts of naphtha.

14. A metal conductor coated according to the process of claim 13 with four coats of the polyvinyl acetal containing composition and two coats of the polyester containing composition.

References Cited by the Examiner

UNITED STATES PATENTS 3,022,200  2/62  Koerner et al. _____ 117—232
3,067,063  12/62  Hall et al. _____ 117—232

FOREIGN PATENTS 564,446  10/58  Canada.

RICHARD D. NEVIUS, *Primary Examiner.*